United States Patent
Rios

(10) Patent No.: US 12,329,138 B2
(45) Date of Patent: Jun. 17, 2025

(54) FISHING TACKLE SYSTEM AND USE THEREOF

(71) Applicant: Lisa Rios, Aldie, VA (US)

(72) Inventor: Lisa Rios, Aldie, VA (US)

(\*) Notice: Subject to any disclaimer, the term of this patent is extended or adjusted under 35 U.S.C. 154(b) by 180 days.

(21) Appl. No.: 17/891,637

(22) Filed: Aug. 19, 2022

(65) Prior Publication Data

US 2023/0058912 A1 Feb. 23, 2023

Related U.S. Application Data

(60) Provisional application No. 63/235,012, filed on Aug. 19, 2021.

(51) Int. Cl.
*A01K 83/04* (2006.01)

(52) U.S. Cl.
CPC .................................. *A01K 83/04* (2013.01)

(58) Field of Classification Search
CPC ....................................................... A01K 83/04
See application file for complete search history.

(56) References Cited

U.S. PATENT DOCUMENTS

| | | | | |
|---|---|---|---|---|
| 31,396 A | \* | 2/1861 | Morris | A01K 83/04 930/DIG. 810 |
| 549,814 A | \* | 11/1895 | Nolan | A01K 83/04 24/698.3 |
| 701,132 A | \* | 5/1902 | Berner | A01K 83/04 43/89 |
| 1,077,850 A | \* | 11/1913 | Mebane | A01K 83/04 43/37 |
| 1,120,870 A | \* | 12/1914 | Ward | A01K 83/04 43/37 |
| 1,624,456 A | \* | 4/1927 | Young | A01K 83/04 43/37 |
| 1,974,358 A | \* | 9/1934 | Glau | A01K 83/04 43/37 |
| 2,149,062 A | \* | 2/1939 | Maurer | A01K 83/04 43/89 |
| 2,205,472 A | | 6/1940 | Fagerholm | |
| 2,632,275 A | \* | 3/1953 | Richardson | A01K 83/04 43/37 |
| 2,648,927 A | \* | 8/1953 | Berry | A01K 83/04 43/37 |
| 2,718,090 A | \* | 9/1955 | Messer | A01K 83/04 43/89 |
| 2,770,065 A | \* | 11/1956 | Walker | A01K 83/04 43/89 |

(Continued)

*Primary Examiner* — Jessica B Wong
(74) *Attorney, Agent, or Firm* — Foley & Lardner LLP

(57) ABSTRACT

A fishing tackle system can be used to catch fish without the use of any hooks. The system can be used with a fishing pole and fishing line. The system can include a first clip member having a first clipping segment and a second clip member having a second clipping segment. The second clip member can be pivotally coupled with the first clip member about a spring-loaded first pivot axis. The system can include a pivoting member pivotally coupled with the first clip member about a second pivot axis or a post that separates the first and second clip members from each other. The first and second clip members can hold the mouth or lip of the fish when they are closed together. The fish can be released by pinching a first pinching segment and a second pinching segment, thus separating the first and second clipping segments.

19 Claims, 13 Drawing Sheets

(56) References Cited

U.S. PATENT DOCUMENTS

| | | | | |
|---|---|---|---|---|
| 2,864,196 A * | 12/1958 | Rohan | ............... | A01K 83/04 43/6 |
| 2,873,548 A * | 2/1959 | Reeder | ............... | A01K 83/04 43/37 |
| 2,897,628 A * | 8/1959 | Thibodeau | ............ | A01K 83/04 43/89 |
| 3,492,752 A | 2/1970 | Viveiros | | |
| 3,975,856 A | 8/1976 | Gadbois | | |
| 4,005,897 A * | 2/1977 | Smith | ............... | A01K 97/14 294/115 |
| 4,557,065 A * | 12/1985 | Rye | ............ | A01K 85/00 43/44.8 |
| 4,620,386 A * | 11/1986 | Hare | ............ | A01K 97/00 43/53.5 |
| 4,638,591 A * | 1/1987 | Neumann | ............ | A01K 83/02 43/89 |
| 4,716,675 A | 1/1988 | Knight | | |
| 5,092,074 A * | 3/1992 | Zincke | ............... | A01K 97/00 43/53.5 |
| 6,247,260 B1 * | 6/2001 | Kandlbinder | ......... | A01K 83/06 43/44.4 |
| 6,871,442 B2 * | 3/2005 | Wyatt | ............... | A01K 83/06 43/44.4 |
| 11,612,152 B1 * | 3/2023 | Price | ............... | A01K 83/06 43/41 |
| 2004/0016170 A1 * | 1/2004 | Fitzgibbons | ........... | A01K 97/14 43/5 |
| 2006/0213110 A1 * | 9/2006 | Nhou | ............... | A01K 97/04 43/44.8 |
| 2016/0194145 A1 * | 7/2016 | Bloch | ............... | A01K 81/04 206/349 |
| 2018/0310537 A1 | 11/2018 | Martin et al. | | |

\* cited by examiner

FISHING TACKLE SYSTEM AND USE THEREOF

CROSS-REFERENCE TO RELATED PATENT APPLICATION

This application claims the benefit and priority of U.S. Provisional Patent Application No. 63/235,012, filed on Aug. 19, 2021, the entirety of which is incorporated by reference herein.

TECHNICAL FIELD

The present application relates to a fishing tackle system. More specifically, the present application relates to a hook-free fishing tackle system.

BACKGROUND

Fishing tackle is equipment used by fishers or anglers when fishing. A traditional or conventional combination of fishing tackle includes a hook fixed with bait and used to pierce a fish's mouth, line attached to the hook, and a sinker used with a fishing lure or the hook.

SUMMARY

At least one aspect of the present disclosure is directed to a fishing tackle system. The fishing tackle system includes a first clip member having a first clipping segment. The fishing tackle system includes a second clip member having a second clipping segment. The second clip member is pivotally coupled with the first clip member about a first pivot axis. The fishing tackle system includes a pivoting member pivotally coupled with the first clip member about a second pivot axis. A length of the pivoting member is less than a length of the first clipping segment. The length of the pivoting member is less than a length of the second clipping segment. The pivoting member is configured to hold apart the first clip member and the second clip member in an open position. The pivoting member is configured to pivot about the second pivot axis when contacted by a force of a fish's mouth to cause the first clip member and the second clip member to close upon each other with a pressure sufficient to hold an edge of the fish's mouth between the first clip member and the second clip member.

Another aspect of the present disclosure is directed to a fishing tackle system. The fishing tackle system includes a first clip member having a first clipping segment. The fishing tackle system includes a second clip member having a second clipping segment. The second clip member is pivotally coupled with the first clip member about a first pivot axis. The fishing tackle system includes a post coupled with the first clip member. The a length of the post is less than a length of the first clipping segment and the length of the post is less than a length of the second clipping segment. The post is configured to hold apart the first clip member and the second clip member in an open position. The post is configured to move when contacted by a force of a fish's mouth to cause the first clip member and the second clip member to close upon each other with a pressure sufficient to hold an edge of the fish's mouth between the first clip member and the second clip member.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Following below are more detailed descriptions of various concepts related to, and implementations of, methods, apparatuses, and systems for fishing and fishing tackle. The various concepts introduced above and discussed in greater detail below may be implemented in any of a number of ways, as the described concepts are not limited to any particular manner of implementation. Examples of specific implementations and applications are provided primarily for illustrative purposes.

It would be advantageous to provide a fishing tackle system that does not include a hook (e.g., fishing hook). While the hook is beneficial for piercing a fish's mouth, the hook can include a point and a barb. The point is the sharp end of the hook that penetrates the fish's mouth, flesh, or body. The barb is the projection extending in the reverse direction from the point. The barb secures the fish from unhooking. These elements of a hook can cause injuries. For example, injuries can occur while one is trying to remove a fish from the line, while one is casting the line, or while one is located near fishing gear. The hook can puncture skin on one's face, hands, fingers, feet, scalp, back, or ears. Additionally, the hook can enter the eye and cause injuries. These injuries are especially concerning for children who may be less adept at handling sharp objects. Therefore, a fishing tackle system that does not include a hook would have advantages such as providing a safer alternative to traditional tackle systems and preventing hook-related injuries such as those described above. Additionally, when fishing with a hook, the hook can frequently pierce parts other than the mouth of the fish, such as the lung and the eyeball. Fishers, especially those with young children, might find it more humane to fish if it was not necessary to rip the barb out of the mouth, flesh, or body of the fish every time a fish is caught.

Figure 1:
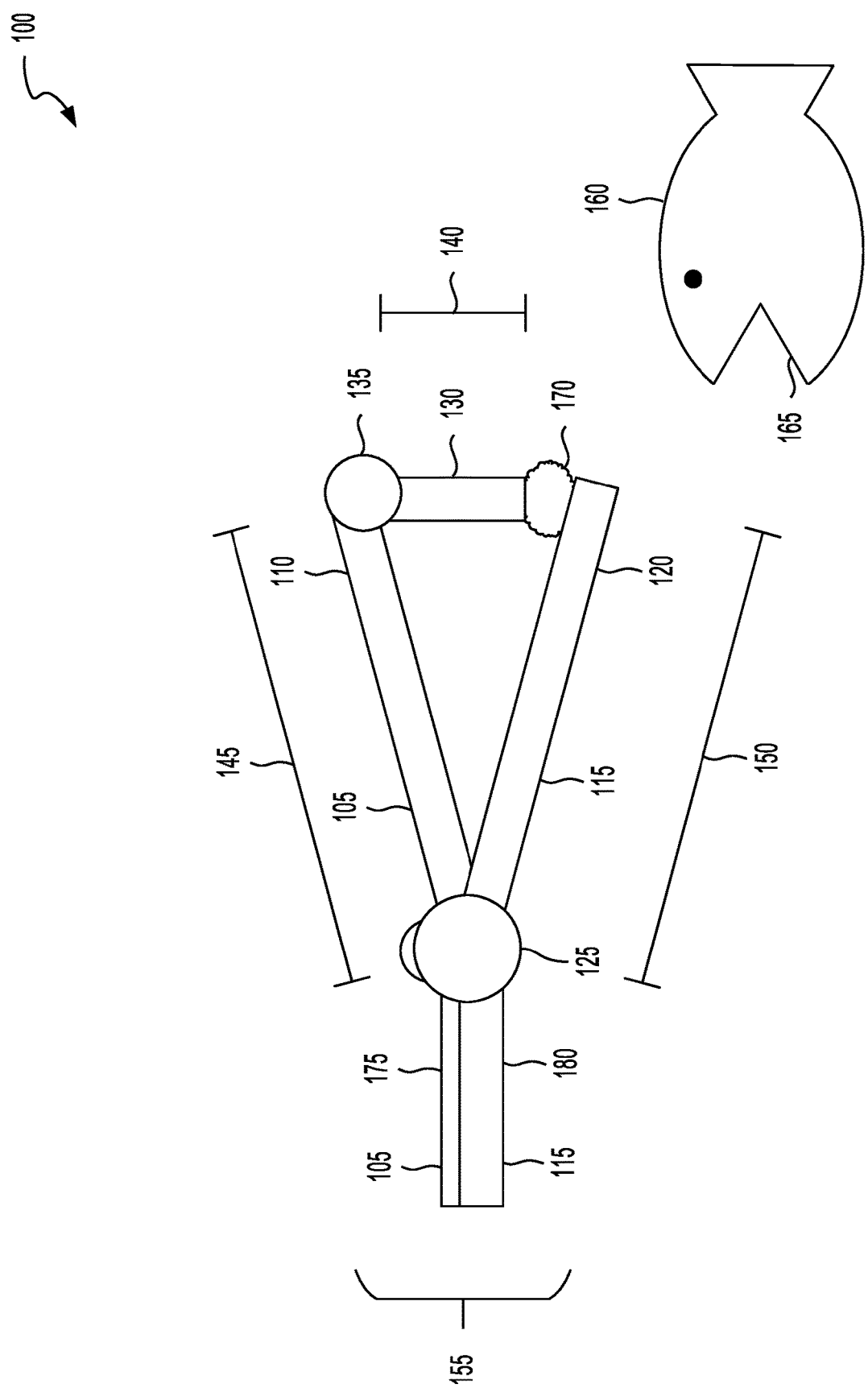
FIG. 1 illustrates a fishing tackle system, according to an example implementation.

FIG. 1 illustrates a fishing tackle system 100. The fishing tackle system 100 can be secured to a fishing pole with fishing line. The fishing tackle system 100 can include a hook-free fishing tackle system. The fishing tackle system 100 can catch a fish 160 by clipping the fish's mouth 165 (e.g., fish's lip). The fishing tackle system 100 can be in an open position 155. The fishing tackle system 100 can include a first clip member 105. The first clip member 105 can include a first clipping segment 110. The first clipping segment 110 can be configured to contact the fish's mouth 165. The first clip member 105 can be made of at least one of carbon steel, aluminum, stainless steel (e.g., austenitic stainless steel), copper, brass, or plastic.

The fishing tackle system 100 can include a second clip member 115. The second clip member 115 can include a second clipping segment 120. The first clip member 105 can be pivotally coupled with the second clip member 115 via a spring. The first clip member 105 can be pivotally coupled with the second clip member 115 via a clamp. The second clipping segment 120 can be configured to contact the fish's mouth 165. The second clipping segment 120 can be configured to close upon the first clipping segment 110. The second clip member 115 can be made of at least one of carbon steel, aluminum, stainless steel (e.g., austenitic stainless steel), copper, brass, or plastic.

The second clip member 115 can be pivotally coupled with the first clip member 105. For example, the second clip member 115 can be pivotally coupled with the first clip member 105 about a first pivot axis 125 (e.g., fulcrum). For example, the second clip member 115 can move about the first pivot axis 125 relative to the first clip member 105. The first clip member 105 can move about the first pivot axis 125 relative to the second clip member 115. The first pivot axis 125 can include a spring. The first pivot axis 125 can be spring-loaded. The first pivot axis 125 can include a clamp. The first pivot axis 125 can include a spring. The second clip member 115 can be held firmly to the first clip member 105 by the spring. The second clip member 115 can be held firmly to the first clip member 105 by the spring at one end of the first clip member 105. The second clip member 115 can be held firmly to the first clip member 105 by the spring within the first pivot axis 125.

The fishing tackle system 100 can include a pivoting member 130. The pivoting member 130 can be pivotally coupled with the first clip member 105 about a second pivot axis 135. The pivoting member 130 can be pivotally coupled with the second clip member 115 about the second pivot axis 135. The pivoting member 130 can be pivotally coupled with the first clipping segment 110 about the second pivot axis 135. The pivoting member 130 can be pivotally coupled with the second clipping segment 120 about the second pivot axis 135. The second pivot axis 135 can include a spring. The second pivot axis 135 can be spring-loaded. The second pivot axis 135 can include a clamp. The pivoting member 130 can be folded away from the first clip member 105. The pivoting member 130 can be folded away from the second clip member 115. The pivoting member 130 can be folded towards (e.g., up against) the first clip member 105. The pivoting member 130 can be folded towards (e.g., up against) the second clip member 115. The pivoting member 130 can be made of at least one of carbon steel, aluminum, stainless steel (e.g., austenitic stainless steel), copper, brass, or plastic. The pivoting member 130 can include a wedge.

The pivoting member 130 can have a length (e.g., pivoting member length 140, length of the pivoting member). The first clipping segment 110 can have a length (e.g., first clipping segment length 145, length of the first clipping segment). The second clipping segment 120 can have a length (e.g., second clipping segment length 150, length of the second clipping segment). The length of the pivoting member can be less than the length of the first clipping segment. The length of the pivoting member can be less than the length of the second clipping segment. The length of the pivoting member can be greater than or equal to the length of the first clipping segment. The length of the pivoting member can be greater than or equal to the length of the second clipping segment.

The pivoting member 130 can be configured to hold apart the first clip member 105 and the second clip member 115 in the open position 155. For example, the pivoting member 130 can include a brace that holds the first clip member 105 and the second clip member 115 in the open position 155. A spring of the first pivot axis 125 can apply a force such that without the pivoting member 130, the first clipping segment 110 and the second clipping segment 120 contact each other. The pivoting member 130 can be configured to separate the first clipping segment 110 and the second clipping segment 120. For example, the pivoting member 130 can be configured to separate the first clipping segment 110 from the second clipping segment 120.

The pivoting member 130 can be configured to pivot about the second pivot axis 135 when contacted by a force of a fish's mouth 165 to cause the first clip member 105 and the second clip member 115 to close upon each other with a pressure sufficient to hold an edge of the fish's mouth 165 between the first clip member 105 and the second clip member 115. The pivoting member 130 can be configured to pivot about the second pivot axis 135 when contacted by a force of a fish's mouth 165 to allow the force of the spring to cause the first clip member 105 and the second clip member 115 to close upon each other with a pressure sufficient to hold an edge of the fish's mouth 165 between the first clip member 105 and the second clip member 115. The pivoting member 130 can be nudged, pushed, or released by the fish 160. The pivoting member 130 can be nudged, pushed, or released by the fish's mouth 165. The pivoting member 130 can have various shapes. The pivoting member 130 can include a solid cylinder shape, a solid flat rectangular shape, or a punctured flat rectangular shape.

The fishing tackle system 100 can include a bait element 170 positioned between the pivoting member 130 and the second clipping segment 120. The bait element 170 can include fishing bait. For example, the bait element 170 can include bread, worms, cheese, insects, shrimp, natural baits, and artificial baits. The bait element 170 can be secured to the fishing tackle system 100 via force exerted by the pivoting member 130 and the first clip member 105. The bait element 170 can be secured to the fishing tackle system 100 via force exerted by the pivoting member 130 and the second clip member 115. The bait element 170 can be secured to the fishing tackle system 100 via force exerted by the first clip member 105 and the second clip member 115. The pivoting member 130 and the first clip member 105 can exert force on the bait element 170. The pivoting member 130 and the second clip member 115 can exert force on the bait element 170. The bait element 170 can sit above a surface of the second clip member 115 that closes towards the first clip member 105. The bait element 170 can sit (e.g., be positioned) in a well or groove, thus making it level with the surface of the second clip member 115 that closes towards the first clip member 105. The bait element 170 can sit in a well or groove thus making it below the surface of the second clip member 115 that closes towards the first clip member 105.

The first clip member 105 can include a first pinching segment 175. The second clip member 115 can include a second pinching segment 180. The first pinching segment 175 and the second pinching segment 180 can be pressed towards each other to move the first clipping segment 110 and the second clipping segment 120 apart. The first pinching segment 175 and the second pinching segment 180 can be pressed towards each other to move the first clipping segment 110 and the second clipping segment 120 apart such that the pivoting member 130 can be wedged between the first clipping segment 110 and the second clipping segment 120. The first pinching segment 175 and the second pinching segment 180 can be pressed towards each other to configure the fishing tackle system 100 in the open position 155. The pivoting member 130, when wedged between the first clipping segment 110 and the second clipping segment 120, can maintain the fishing tackle system 100 in the open position 155 until the pivoting member 130 is moved.

Figure 2:
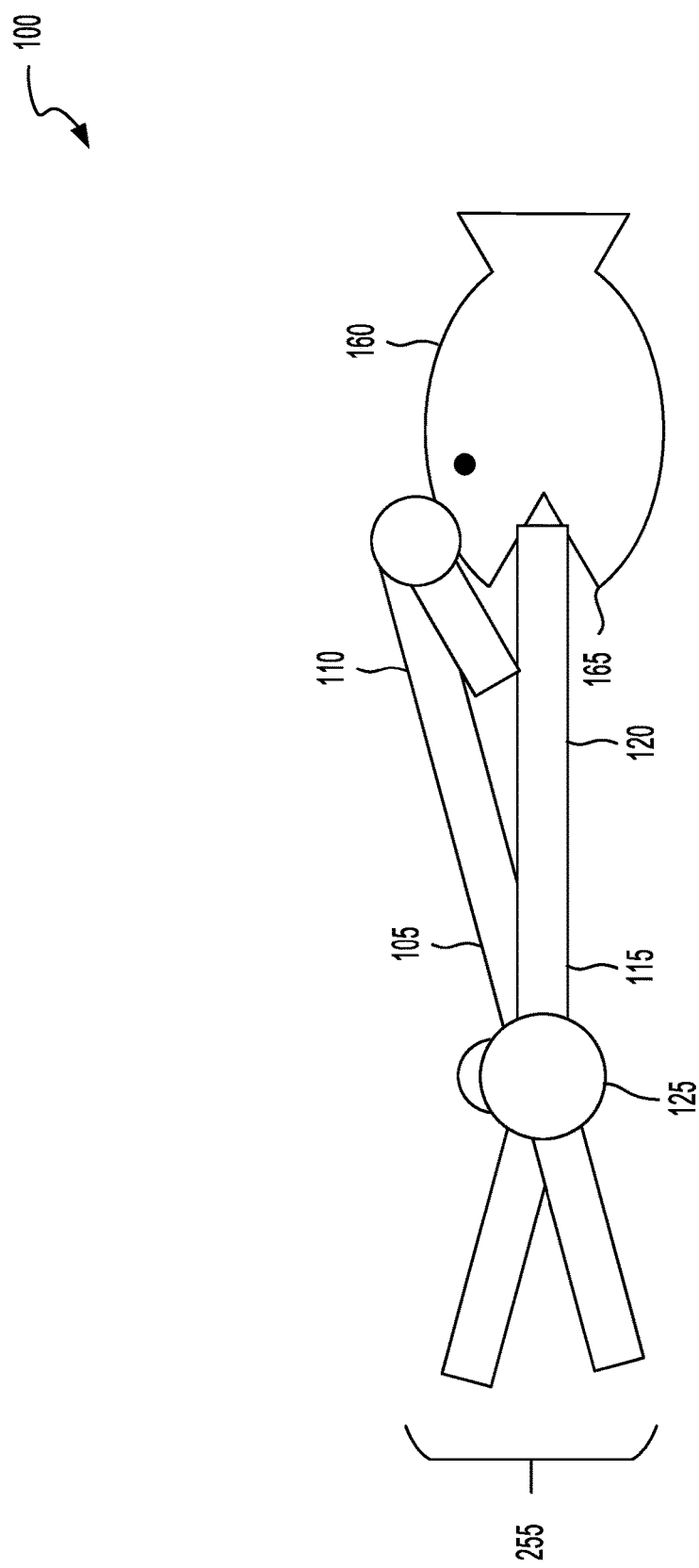
FIG. 2 illustrates a fishing tackle system, according to an example implementation.

FIG. 2 illustrates the fishing tackle system 100. The fishing tackle system 100 can be in a closed position 255. The fishing tackle system 100 can transition from the open position 155 to the closed position 255 when the fish 160 presses against the pivoting member 130. The fish 160 can apply a force to the pivoting member 130 such that the first clip member 105 and the second clip member 115 snap shut. The fishing tackle system 100 can transition from the open position 155 to the closed position 255 when the fish's mouth 165 presses against the pivoting member 130. The fish's mouth 165 can apply a force to the pivoting member 130 such that the first clip member 105 and the second clip member 115 snap shut. The first clip member 105 and the second clip member 115 can snap shut when the first clipping segment 110 and the second clipping segment 120 close upon each other. The fish 160 can release the pivoting member 130 and thereby shut or close the fishing tackle system 100. The fish 160 can be retained between the first clip member 105 and the second clip member 115 in the closed position 255. The pivoting member 130 can fold towards the first clipping segment 110. The pivoting member 130 can fold towards the second clipping segment 120.

The second clip member 115 can move about the first pivot axis 125 relative to the first clip member 105 when moving from the open position 155 to the closed position 255 or when moving from the closed position 255 to the open position 155. The first clip member 105 can move about the first pivot axis 125 relative to the second clip member 115 when moving from the open position 155 to the closed position 255 or when moving from the closed position 255 to the open position 155. The first pivot axis 125 can include a spring. The first pivot axis 125 can be spring-loaded. The first pivot axis 125 can include a clamp. The first pivot axis 125 can include a spring. The spring can be disposed (e.g., positioned) along the first pivot axis 125. The spring can be configured to exert a force to hold the first clip member 105 and the second clip member 115 in the closed position 255.

The first clipping segment 110 and the second clipping segment 120 can be configured to secure the fish 160 when the pivoting member 130 pivots about the second pivot axis 135. The first clipping segment 110 and the second clipping segment 120 can be configured to secure the fish's mouth 165 when the pivoting member 130 pivots about the second pivot axis 135. The first clipping segment 110 and the second clipping segment 120 can clamp onto the fish 160. The first clipping segment 110 and the second clipping segment 120 can clamp onto the fish's mouth 165.

The first clipping segment 110 can be configured to contact the second clipping segment 120 when the pivoting member 130 pivots about the second pivot axis 135. For example, the first clipping segment 110 and the second clipping segment 120 can contact each other in the closed position 255. The first clip member 105 can be configured to contact the second clip member 115 when the pivoting member 130 pivots about the second pivot axis 135

The pivoting member 130 can be configured to pivot about the second pivot axis 135. The pivoting member 130 can be configured to fold between the first clip member 105 and the second clip member 115 in the closed position 255. For example, the pivoting member 130 can collapse between the first clip member 105 and the second clip member 115 when the fishing tackle system 100 is in the closed position 255.

Figure 3:
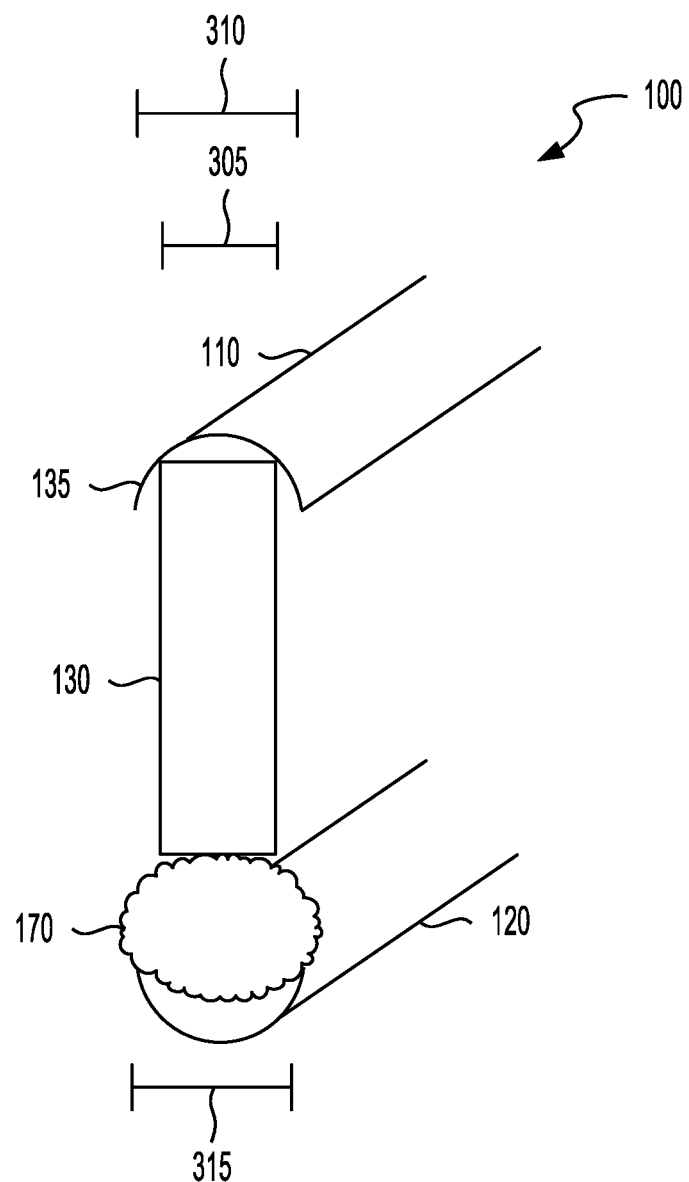
FIG. 3 illustrates a perspective view of a fishing tackle system, according to an example implementation.

FIG. 3 illustrates a perspective view of the fishing tackle system 100. The first clipping segment 110 can have a width (e.g., first clipping segment width 310, width of the first clipping segment). The second clipping segment 120 can have a width (e.g., second clipping segment width 315, width of the second clipping segment). The first clipping segment width 310 can be less than, greater than, or equal to the second clipping segment width 315. The pivoting member 130 can have a width (e.g., pivoting member width 305, width of the pivoting member). The pivoting member width 305 can be less than the first clipping segment width 310. The pivoting member width 305 can be less than the second clipping segment width 315. The width of the pivoting member can be less than the width of the first clipping segment. The pivoting member width 305 can be less than the first clipping segment width 310. The width of the pivoting member can be less than the width of the second clipping segment. The pivoting member width 305 can be less than the second clipping segment width 315. The pivoting member width 305 can be less than the first clipping segment width 310 and the second clipping segment width 315 such that the first clipping segment 110 closes against the second clipping segment 120. The pivoting member width 305 can be in a range of 0.125 inches to 0.5 inches. For example, the pivoting member width 305 can be 0.125 inches, 0.15 inches, 0.175 inches, 0.2 inches, 0.225 inches, 0.25 inches, 0.275 inches, 0.3 inches, 0.325 inches, 0.35 inches, 0.375 inches, 0.4 inches, 0.425 inches, 0.45 inches, 0.475 inches, or 0.5 inches.

Figure 4:
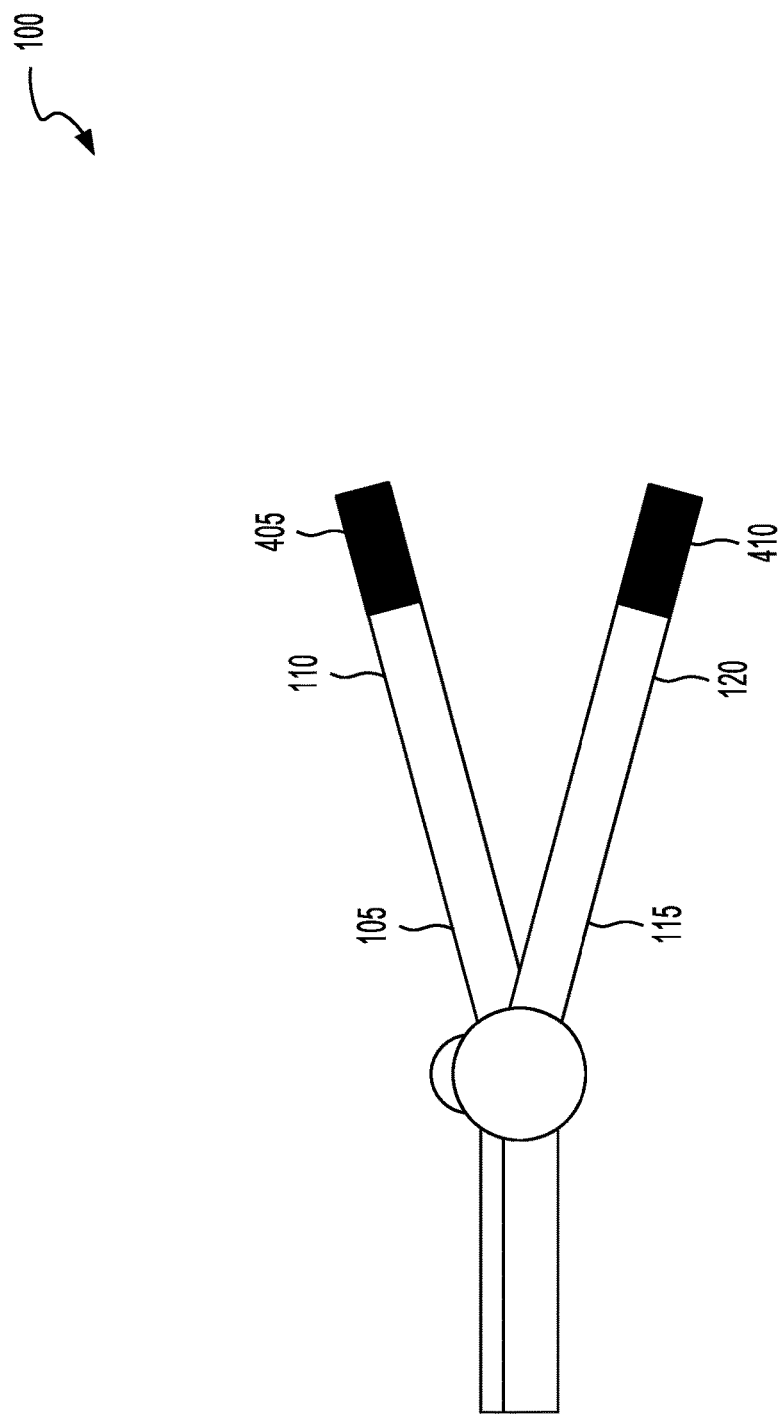
FIG. 4 illustrates a fishing tackle system, according to an example implementation.

FIG. 4 illustrates the fishing tackle system 100. The first clipping segment 110 can include a first frictional element 405 (e.g., first grips). The first frictional element 405 can include silicone, rubber, or a non-slip coating. The first frictional element 405 can grip the fish's mouth 165. The pivoting member 130 can be adjacent to the first frictional element 405. The first frictional element 405 can secure the fish 160 against the second clipping segment 120. The first frictional element 405 can secure the fish 160 against the second clip member 115.

The second clipping segment 120 can include a second frictional element 410 (e.g., second grips). The second frictional element 410 can include silicone, rubber, or a non-slip coating. The second frictional element 410 can grip the fish's mouth 165. The pivoting member 130 can be adjacent to the second frictional element 410. The pivoting member 130 can be adjacent to the second frictional element 410 such that the pivoting member 130 can be nudged, pushed, or released by the fish 160. The second frictional element 410 can secure the fish 160 against the first clipping segment 110. The second frictional element 410 can secure the fish 160 against the first clip member 105.

Figure 5:
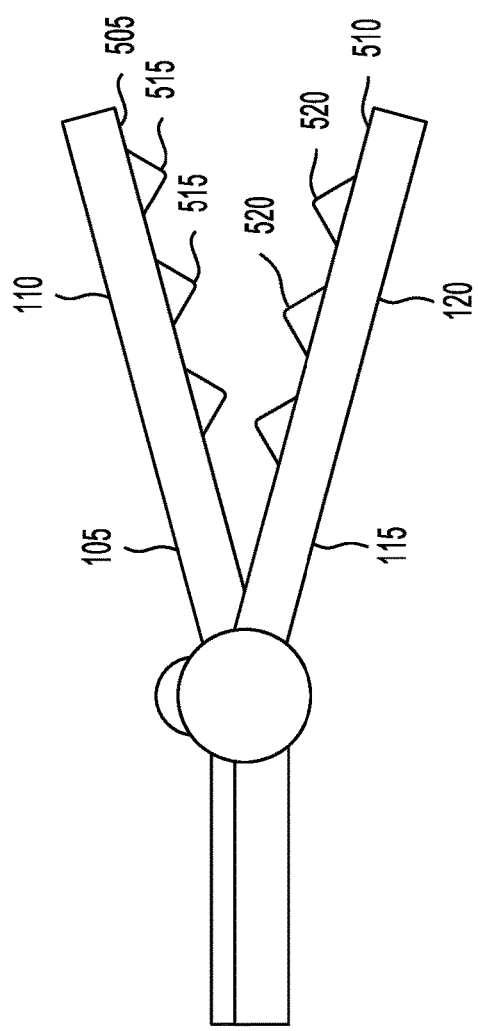
FIG. 5 illustrates a fishing tackle system, according to an example implementation.

FIG. 5 illustrates the fishing tackle system 100. The first clipping segment 110 can include a first serrated side 505 (e.g., first textured side). The first serrated side 505 can secure the fish 160 against the second clipping segment 120. The first serrated side 505 can secure the fish 160 against the second clip member 115. The first serrated side 505 can include one or more first serrated elements 515. The one or more first serrated elements 515 can include dull teeth.

The second clipping segment 120 can include a second serrated side 510 (e.g., second textured side). The second serrated side 510 can secure the fish 160 against the first clipping segment 110. The second serrated side 510 can secure the fish 160 against the first clip member 105. The second serrated side 510 can include one or more second serrated elements 520. The one or more second serrated elements 520 can include dull teeth. The one or more second serrated elements 520 can wedge between the one or more first serrated elements 515. The one or more second serrated elements 520 can interleave with the one or more first serrated elements 515.

Figure 6:
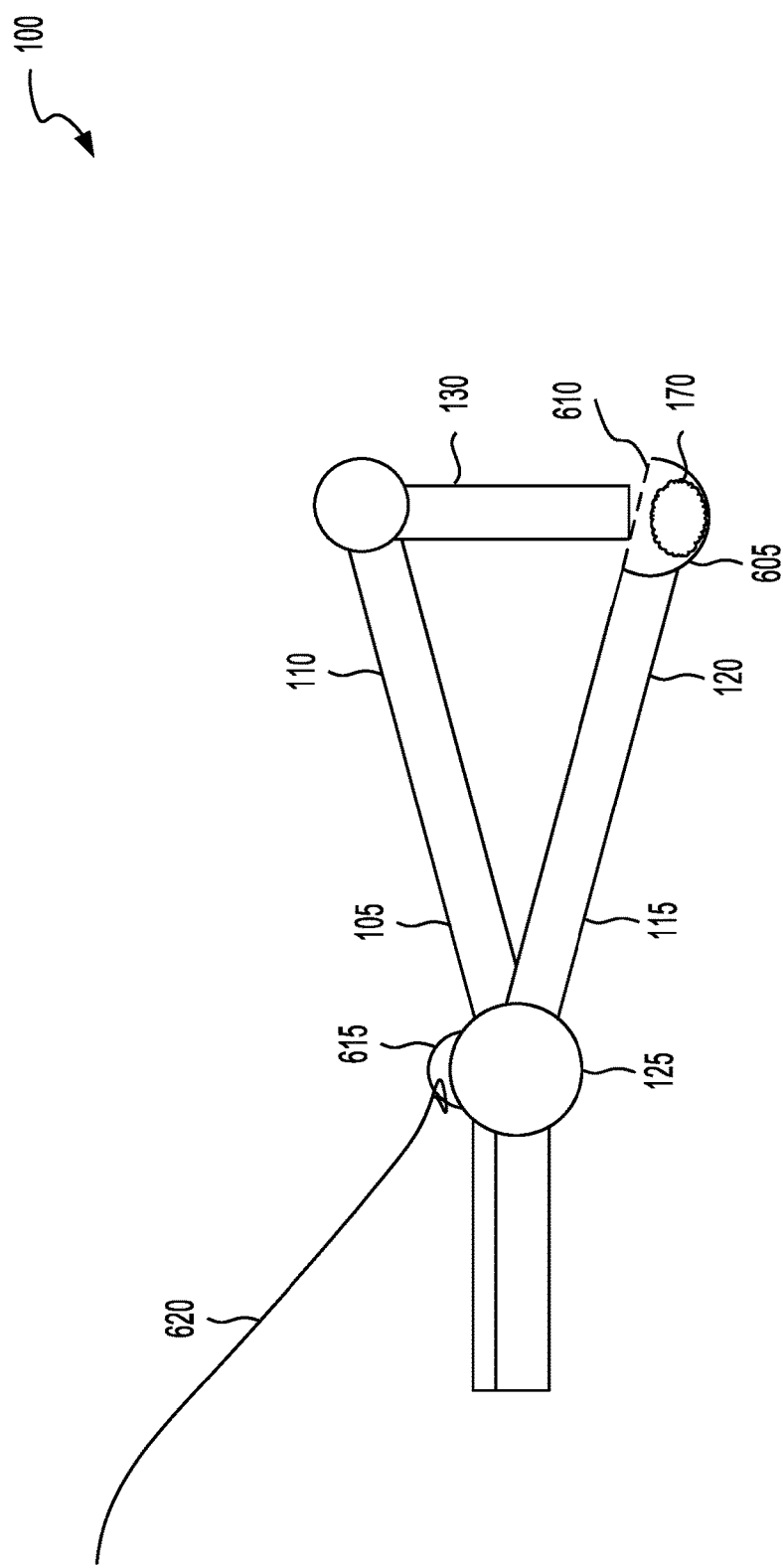
FIG. 6 illustrates a fishing tackle system, according to an example implementation.

FIG. 6 illustrates the fishing tackle system 100. The second clipping segment 120 can include a recess 605 (e.g., well). The recess 605 can be configured to receive the bait element 170. The recess 605 can be configured to receive the bait element 170 for attracting the fish 160. The second clipping segment 120 can include a mesh 610 (e.g., mesh cover, cover, wire mesh) configured to separate the bait element 170 from the pivoting member 130. The mesh 610 can increase the difficulty of procuring the bait element 170 by the fish 160. The mesh 610 can cover the recess 605. The mesh 610 can be lifted such that the bait element 170 can be inserted into the recess 605. The mesh 610 can be held closed by the pivoting member 130. The mesh 610 can be secured against the recess 605 by the pivoting member 130. The mesh 610 can be fixed or movable. The mesh 610 can be opened such that the bait element 170 can be loaded into the recess 605. The mesh 610 can be coupled with the recess 605. For example, the mesh 610 can be clipped to the recess 605. The recess 605 can be fixed or movable. The recess 605 can be opened such that the bait element 170 can be loaded into the recess 605. The recess 605 can be clipped to the mesh 610. The recess 605 can be closed by clicking to the mesh 610. The recess 605 can be closed by a connecting piece of the second clipping segment 120.

The fishing tackle system 100 can include a ring 615. The ring 615 can be coupled with the first clip member 105. The ring 615 can be coupled with the second clip member 115. The ring 615 can be coupled with the first pivot axis 125. The ring 615 can be coupled with the spring. The ring 615 can be coupled with fishing line 620. For example, the ring 615 can be configured to receive the fishing line 620. The ring 615 can be coupled with fishing line 620. The fishing line 620 can be coupled with a fishing pole. The ring 615 can include a partial ring (e.g., half-ring).

Figure 7:
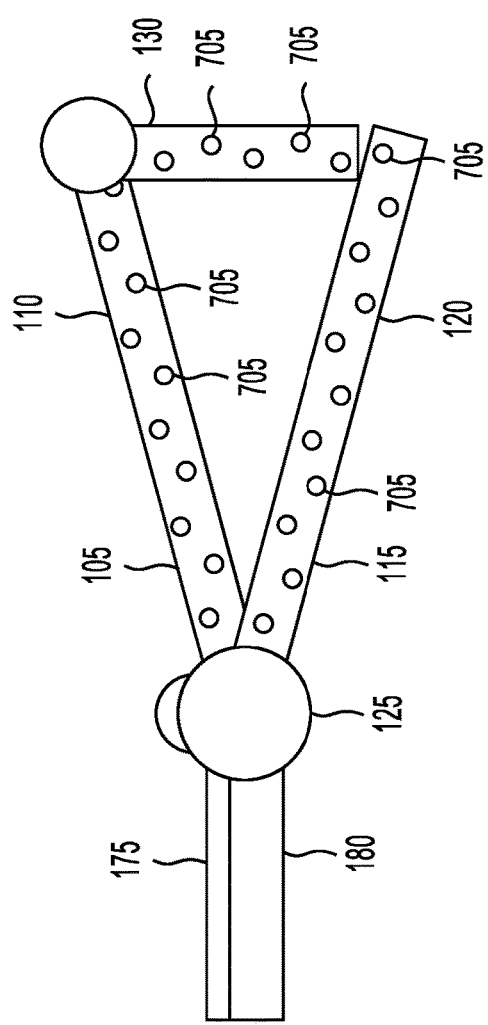
FIG. 7 illustrates a fishing tackle system, according to an example implementation.

FIG. 7 illustrates the fishing tackle system 100. The first clipping segment 110 can include one or more holes 705 (e.g., one or more vents, one or more slots). The one or more holes 705 can reduce the drag on the first clipping segment 110 as the first clipping segment 110 closes upon the second clipping segment 120. The second clipping segment 120 can include one or more holes 705. The one or more holes 705 can reduce the drag on the second clipping segment 120 as the second clipping segment 120 closes upon the first clipping segment 110. The pivoting member 130 can include one or more holes 705. The one or more holes 705 can reduce the drag on the pivoting member 130 as the pivoting member 130 closes upon the first clipping segment 110. The one or more holes 705 can reduce the drag on the pivoting member 130 as the pivoting member 130 closes upon the second clipping segment 120. The one or more holes 705 can direct water through the first clipping segment 110. The one or more holes 705 can direct water through the second clipping segment 120. The directed water can pull the fish 160 towards the first pivot axis 125. The first clip member 105 can include one or more holes 705. The second clip member 115 can include one or more holes 705. The first pinching segment 175 can include one or more holes 705. The second pinching segment 180 can include one or more holes 705.

Figure 8:
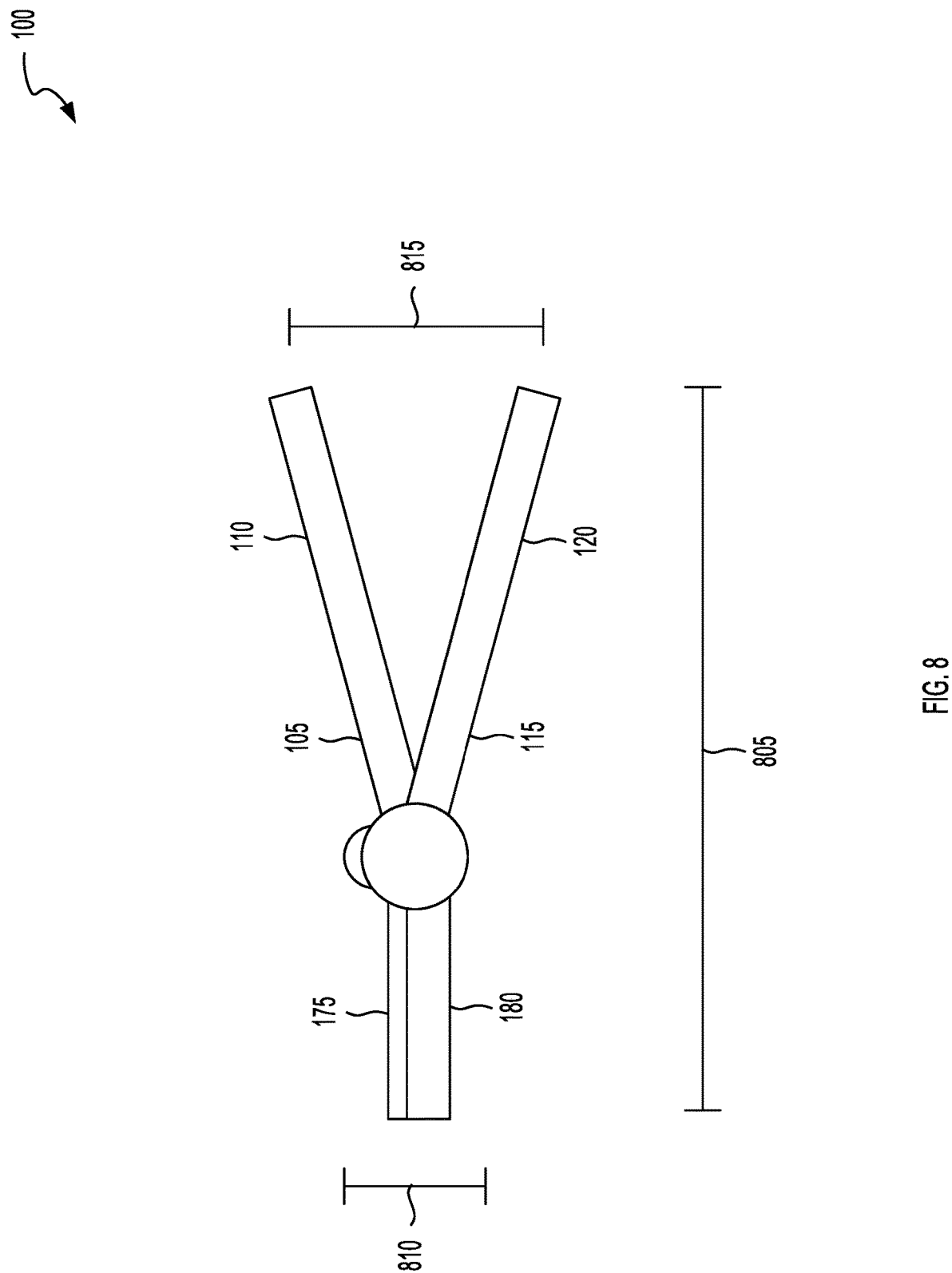
FIG. 8 illustrates a fishing tackle system, according to an example implementation.

FIG. 8 illustrates the fishing tackle system 100. The fishing tackle system 100 can have a length (e.g., fishing tackle system length 805). The fishing tackle system length 805 can be in a range of 2 inches and 4 inches. For example, the fishing tackle system length 805 can be 2.0 inches, 2.1 inches, 2.2 inches, 2.3 inches, 2.4 inches, 2.5 inches, 2.6 inches, 2.7 inches, 2.8 inches, 2.9 inches, 3.0 inches, 3.1 inches, 3.2 inches, 3.3 inches, 3.4 inches, 3.5 inches, 3.6 inches, 3.7 inches, 3.8 inches, 3.9 inches, or 4.0 inches.

The first pinching segment 175 and the second pinching segment 180 can be separated by a distance (e.g., pinching segment distance 810). The pinching segment distance 810 can be in range of 0 inches to 2.5 inches. For example, the pinching segment distance 810 can be 0.0 inches, 0.1 inches, 0.2 inches, 0.3 inches, 0.4 inches, 0.5 inches, 0.6 inches, 0.7 inches, 0.8 inches, 0.9 inches, 1.0 inch, 1.1 inches, 1.2 inches, 1.3 inches, 1.4 inches, 1.5 inches, 1.6 inches, 1.7 inches, 1.8 inches, 1.9 inches, 2.0 inches, 2.1 inches, 2.2 inches, 2.3 inches, 2.4 inches, or 2.5 inches.

The first clipping segment 110 and the second clipping segment 120 can be separated by a distance (e.g., clipping segment distance 815). The clipping segment distance 815 can be greater than or equal to 1 inch. For example, the clipping segment distance 815 can be 1.0 inch, 1.1 inches, 1.2 inches, 1.3 inches, 1.4 inches, 1.5 inches, 1.6 inches, 1.7 inches, 1.8 inches, 1.9 inches, 2.0 inches, 2.1 inches, 2.2 inches, 2.3 inches, 2.4 inches, or 2.5 inches. The clipping segment distance 815 can be such that the fish's mouth 165 does not encapsulate the first clipping segment 110 and the second clipping segment 120 when the fishing tackle system 100 is in the open position 155.

Figure 9:
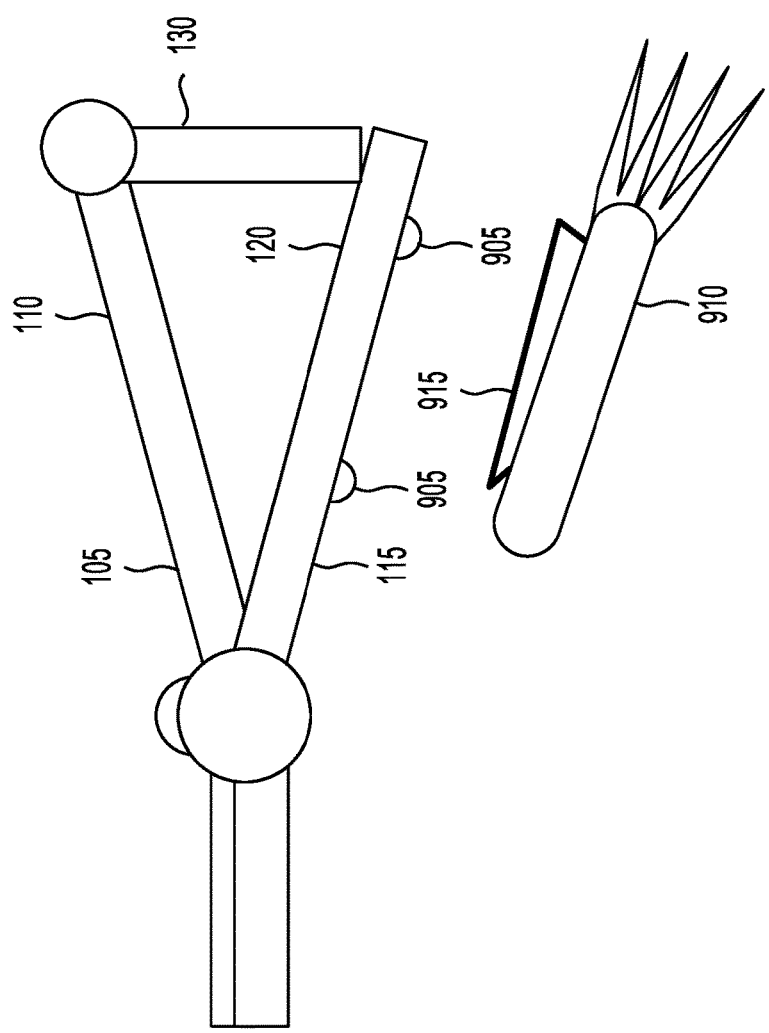
FIG. 9 illustrates a fishing tackle system, according to an example implementation.

FIG. 9 illustrates the fishing tackle system 100. The fishing tackle system 100 can include one or more lure rings 905. The one or more lure rings 905 can be coupled with the second clipping segment 120. The one or more lure rings 905 can be coupled with the second clip member 115. The one or more lure rings 905 can include partial rings (e.g., half-rings). The one or more lure rings 905 can be configured to receive a lure 910 (e.g., jig). The lure 910 can coupled with the one or more lure rings 905. The lure 910 can include a lure clip 915. The lure clip 915 can couple with the one or more lure rings 905. For example, the lure clip 915 can be inserted into the one or more lure rings 905. The lure clip 915 can slide into the one or more lure rings 905. The lure clip 915 can include a pointed end. The lure 910 can be released from the one or more lure rings 905 by lifting the pointed end of the lure clip 915 and sliding the lure clip 915 through the one or more lure rings 905. The one or more lure rings 905 can be configured to receive the bait element 170.

Figure 10:
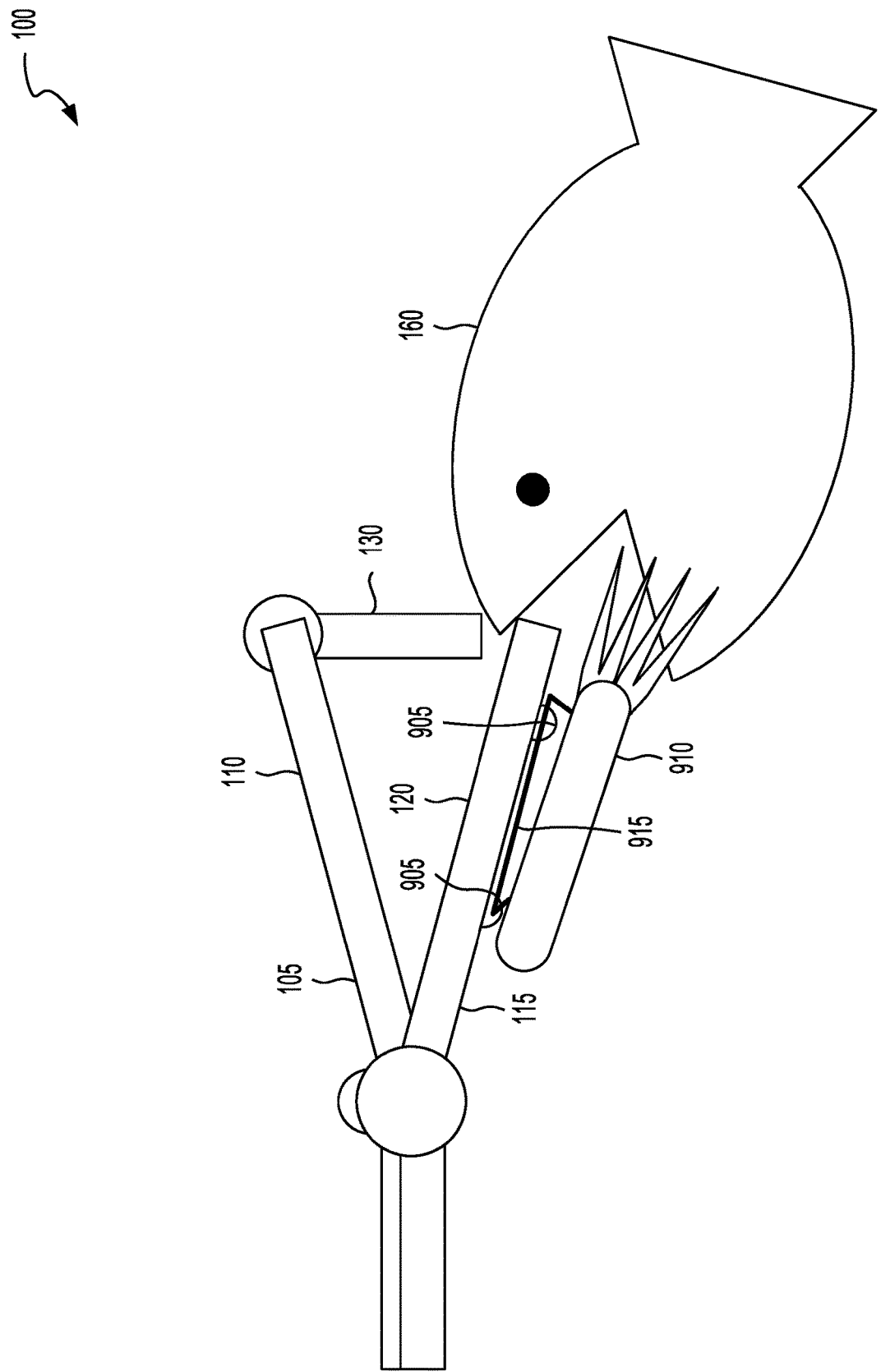
FIG. 10 illustrates a fishing tackle system, according to an example implementation.

FIG. 10 illustrates the fishing tackle system 100. The fishing tackle system 100 can include the one or more lure rings 905. The fishing tackle system 100 can include the lure 910. The fishing tackle system 100 can include the lure clip 915. The fish 160 can be attracted by the lure 910. The pivoting member 130 can be nudged, pushed, or released by the fish 160.

Figure 11:
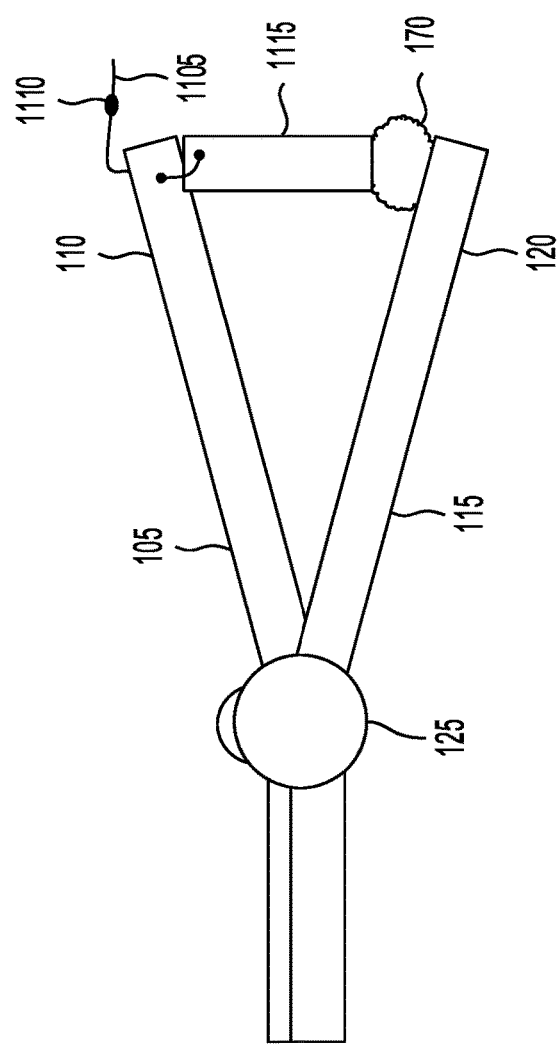
FIG. 11 illustrates a fishing tackle system, according to an example implementation.

FIG. 11 illustrates a fishing tackle system 100. The fishing tackle system 100 can include a post 1115 (e.g., peg, wedge, etc.). The post 1115 can wedge the first clip member 105 and the second clip member 115 apart. The post 1115 can separate the first clipping segment 110 and the second clipping segment 120. The post 1115 can keep the first clipping segment 110 and the second clipping segment 120 apart. The post 1115 can be coupled with the first clip member 105. From example, the post 1115 can be pressed up against the first clip member 105. The post 1115 can be coupled with the second clip member 115. For example, the post 1115 can be pressed up against the second clip member 115. The post 1115 can be nudged out of place from different angles. The post 1115 can be attached to the first clipping segment 110. For example, the post 1115 can be attached to the first clipping segment 110 by a fishing line 1105 (e.g., string, rope, thread, cable, etc.). The fishing line 1105 can go through one end of the post 1115. The fishing line 1105 can go through one end of the post 1115. The fishing line 1105 can go through a hole in one end of the post 1115. The fishing line 1105 can include a stopper 1110 (e.g., bead, knot, etc.). The stopper 1110 can preventing the post 1115 from detaching from the first clipping segment 110. The fishing line 1105 can secure the post 1115 to the fishing tackle system 100. The post 1115 can hold the fishing tackle system 100 in the open position 155. The fishing line 1105 can prevent the post 1115 from separating from the fishing tackle system 100 when the fishing tackle system 100 is in the closed position 255.

A length of the post 1115 can be less than the length of the first clipping segment and the length of the post 1115 can be is less than the length of the second clipping segment. The post 1115 can be configured to hold apart the first clip member 105 and the second clip member 115 in the open position 155. The post 1115 can be configured to move when contacted by a force of the fish's mouth 165 to cause the first clip member 105 and the second clip member 115 to close upon each other with a pressure sufficient to hold an edge of the fish's mouth 165 between the first clip member 105 and the second clip member 115.

Figure 12:
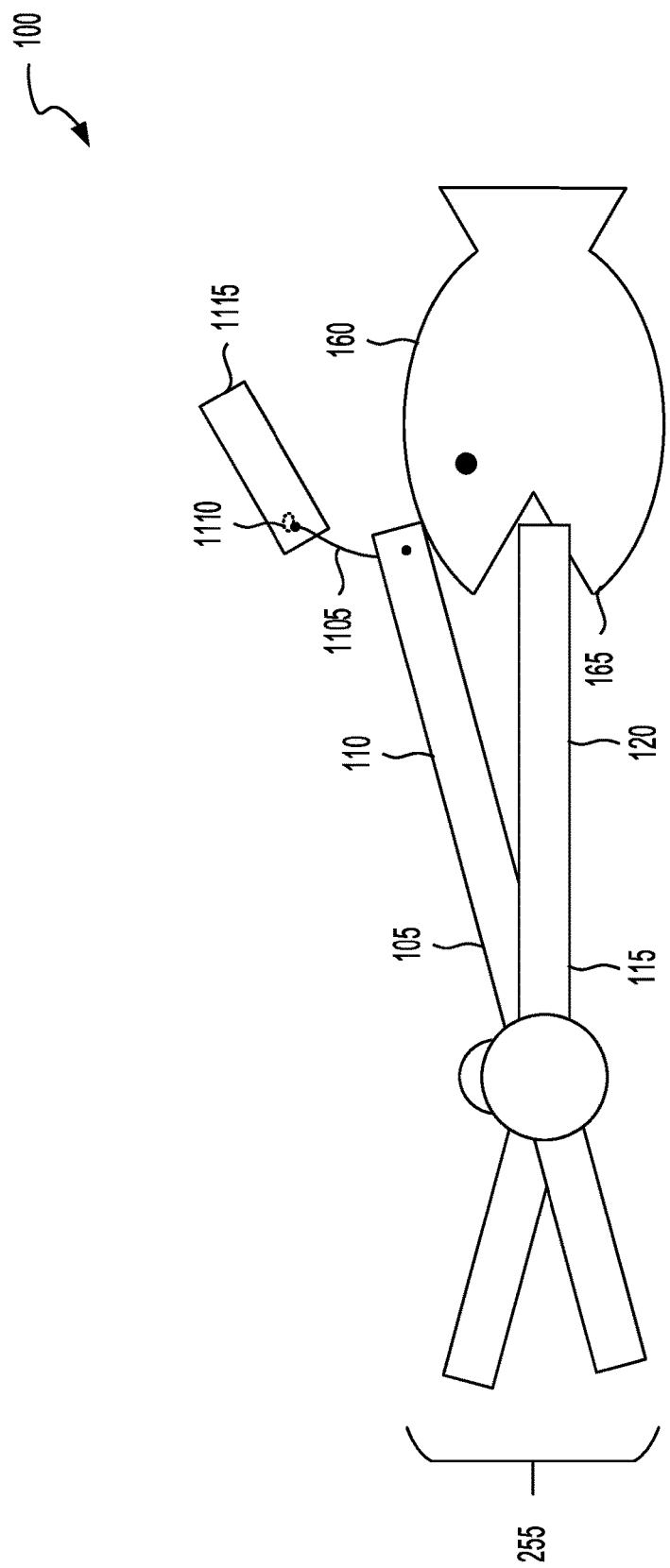
FIG. 12 illustrates a fishing tackle system, according to an example implementation.

FIG. 12 illustrates a fishing tackle system 100. The post 1115 can be knocked partially free which can allow the first clipping segment 110 to close towards the second clipping segment 120. The post 1115 can be configured to dislodge from between the first clipping segment 110 and the second clipping segment 120. The post 1115 can be configured to dislodge from between the first clipping segment 110 and the second clipping segment 120 while remaining affixed to the first clipping segment 110. The post 1115 can be configured to dislodge from between the first clipping segment 110 and the second clipping segment 120 while remaining affixed to the second clipping segment 120.

The post 1115 can be secured by the fishing line 1105 such that it is not completely separated from the fishing tackle system 100. The stopper 1110 can preventing the post 1115 from detaching from the first clipping segment 110. The fishing line 1105 including the stopper 1110 can prevent the post 1115 from separating from the fishing tackle system 100 when the fishing tackle system 100 is in the closed position 255. The fish 160 can release the post 1115 even if the fish's mouth 165 comes around the second clipping segment 120 from the side.

Figure 13:
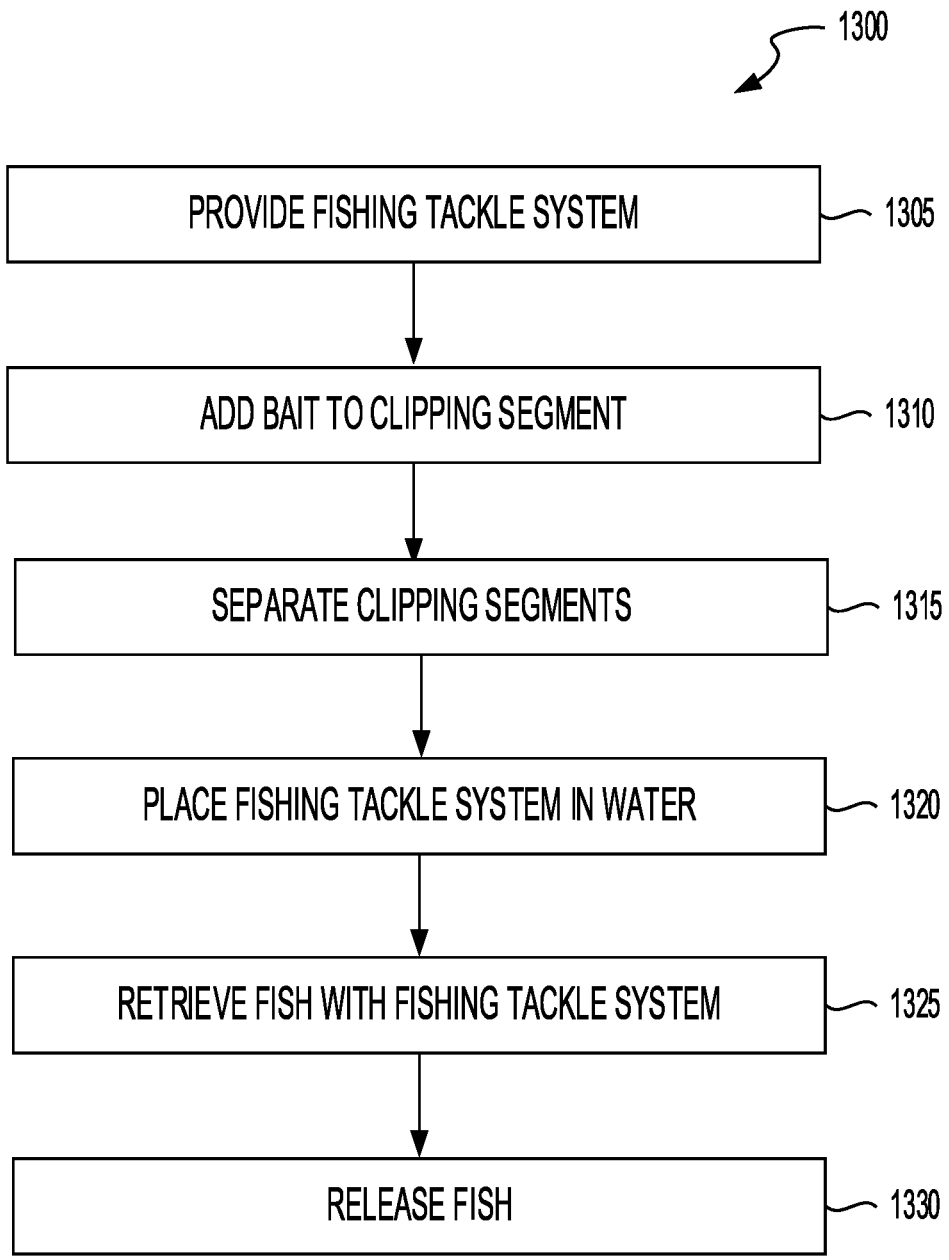
FIG. 13 illustrates a method of fishing using a fishing tackle system, according to an example implementation.

FIG. 13 illustrates a method of fishing (e.g., method 1300). The method 1300 can include providing a fishing tackle system 1305. The method 1300 can include adding a bait element to the second clipping segment 1310. The method 1300 can include separating the first clipping segment and the second clipping segment from each other with a pivoting member or wedge 1315. The method 1300 can include placing the fishing tackle system in water containing one or more fish 1320. The method 1300 can include retrieving a fish of the one or more fish with the fishing tackle system after the edge of the fish's mouth is retained between the first clip member and the second clip member 1325. The method 1300 can include releasing the fish by pinching a first pinching segment and a second pinching segment together, thereby separating the first clip member from the second clip member 1330. The steps of the aforementioned method 1300 can be repeated any number of times.

Any references to implementations or elements or acts of the systems and methods herein referred to in the singular can include implementations including a plurality of these elements, and any references in plural to any implementation or element or act herein can include implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Elements other than 'A' and 'B' can also be included.

The systems and methods described herein may be embodied in other specific forms without departing from the characteristics thereof. The foregoing implementations are illustrative rather than limiting of the described systems and methods.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A fishing tackle system, comprising:
a first clip member having a first clipping segment;
a second clip member having a second clipping segment, the second clip member pivotally coupled with the first clip member about a first pivot axis; and
a pivoting member pivotally coupled with the first clip member about a second pivot axis disposed at a first end of the first clip member;
wherein a length of the pivoting member is less than a length of the first clipping segment and the length of the pivoting member is less than a length of the second clipping segment;
wherein the pivoting member is disposed between the first end of the first clip member and a first end of the second clip member, the pivoting member configured to hold apart the first clip member and the second clip member in an open position;
wherein the pivoting member is configured to pivot about the second pivot axis when contacted by a force of a fish's mouth to cause the first clip member and the second clip member to close upon each other with a pressure sufficient to hold an edge of the fish's mouth between the first end of the first clip member and the first end of the second clip member; and
wherein the fishing tackle system is free of any hooks, barbs, and points configured to penetrate the fish.

2. The fishing tackle system of claim 1, wherein the pivoting member is configured to separate the first clipping segment and the second clipping segment.

3. The fishing tackle system of claim 1, wherein the first clipping segment and the second clipping segment are configured to secure a fish when the pivoting member pivots about the second pivot axis.

4. The fishing tackle system of claim 1, wherein the first clipping segment is configured to contact the second clipping segment when the pivoting member pivots about the second pivot axis.

5. The fishing tackle system of claim 1, further comprising a bait element positioned between the pivoting member and the second clipping segment.

6. The fishing tackle system of claim 1, wherein the first clip member is pivotally coupled with the second clip member via a spring.

7. The fishing tackle system of claim 1, wherein:
the first clipping segment comprises a first frictional element; and
the second clipping segment comprises a second frictional element.

8. The fishing tackle system of claim 1, wherein the second clipping segment comprises a recess configured to receive a bait element.

9. The fishing tackle system of claim 1, wherein the second clipping segment comprises:
a recess configured to receive a bait element for attracting a fish; and
a mesh configured to separate the bait element from the pivoting member.

10. The fishing tackle system of claim 1, further comprising a ring coupled with at least one of the first clip member or the second clip member, the ring configured to receive fishing line.

11. The fishing tackle system of claim 1, wherein at least one of the first clip member, the second clip member, or the pivoting member is comprised of at least one of carbon steel, aluminum, stainless steel, copper, brass, or plastic.

12. The fishing tackle system of claim 1, wherein the pivoting member is configured to pivot about the second pivot axis and fold between the first clip member and the second clip member in a closed position.

13. The fishing tackle system of claim 1, wherein a width of the pivoting member is less than a width of the first clipping segment and the width of the pivoting member is less than a width of the second clipping segment.

14. The fishing tackle system of claim 1, further comprising one or more lure rings coupled with the second clipping segment.

15. The fishing tackle system of claim 1, further comprising:
one or more lure rings coupled with the second clipping segment; and
a lure coupled with the one or more lure rings.

16. The fishing tackle system of claim 1, further comprising:
a spring disposed along the first pivot axis, the spring configured to exert a force to hold the first clip member and the second clip member in a closed position.

17. A method of fishing, comprising:
providing the fishing tackle system of claim 1;
adding a bait element to the second clipping segment;
separating the first clipping segment and second clipping segments;
placing the fishing tackle system in water containing one or more fish;
retrieving a fish of the one or more fish with the fishing tackle system after the edge of the fish's mouth is retained between the first clip member and the second clip member; and
releasing the fish by pinching a first pinching segment and a second pinching segment together, thereby separating the first clip member from the second clip member;
wherein the method is free from use of any hooks, barbs, and points configured to penetrate the fish.

18. A fishing tackle system, comprising:
a first clip member having a first clipping segment;
a second clip member having a second clipping segment, the second clip member pivotally coupled with the first clip member about a first pivot axis; and
a post coupled with the first clip member;
wherein a length of the post is less than a length of the first clipping segment and the length of the post is less than a length of the second clipping segment;
wherein the post is disposed between a first end of the first clip member and a first end of the second clip member, the post configured to hold apart the first clip member and the second clip member in an open position;
wherein the post is configured to move when contacted by a force of a fish's mouth to cause the first clip member and the second clip member to close upon each other with a pressure sufficient to hold an edge of the fish's mouth between the first end of the first clip member and the first end of the second clip member; and wherein the fishing tackle system is free of any hooks, barbs, and points configured to penetrate the fish.

19. The fishing tackle system of claim 18, wherein the post is configured to dislodge from between the first clipping segment and the second clipping segment while remaining affixed to the first clipping segment.

\* \* \* \* \*